US007361867B2

(12) United States Patent
Von Steuben et al.

(10) Patent No.: US 7,361,867 B2
(45) Date of Patent: Apr. 22, 2008

(54) ELECTRONIC SCALE AND METHOD FOR WEIGHT MEASUREMENT INCLUDING CORRECTION MEANS FOR CORRECTING A WEIGHT DEPENDENT SIGNAL

(75) Inventors: Jan Von Steuben, Goettingen (DE); Michael Mueller, Goettingen (DE); Alfred Klauer, Goettingen (DE)

(73) Assignee: Sartorius AG, Goettingen (DE)

( * ) Notice: Subject to any disclaimer, the term of this patent is extended or adjusted under 35 U.S.C. 154(b) by 17 days.

(21) Appl. No.: 11/429,206

(22) Filed: May 8, 2006

(65) Prior Publication Data

US 2006/0216004 A1 Sep. 28, 2006

Related U.S. Application Data

(63) Continuation of application No. PCT/EP2004/11033, filed on Oct. 2, 2004.

(30) Foreign Application Priority Data

Nov. 15, 2003 (DE) ................................ 103 53 414

(51) Int. Cl.
*H05B 1/02* (2006.01)

(52) U.S. Cl. ....................... 219/518; 219/494; 219/506

(58) Field of Classification Search ................ 219/492, 219/494, 497, 501, 505, 506, 508, 518; 307/117
See application file for complete search history.

(56) References Cited

U.S. PATENT DOCUMENTS 4,656,599 A 4/1987 Knothe et al.
4,763,739 A 8/1988 Kasinoff

FOREIGN PATENT DOCUMENTS

EP 1 130 370 A2 9/2001

*Primary Examiner*—Mark Paschall
(74) *Attorney, Agent, or Firm*—Sughrue Mion, PLLC (57) ABSTRACT

A scale having an electronic weighing system to generate a weight-dependent signal and a digital signal processing unit (18). The digital signal processing unit (18) has a circuit or program parts which measure the time elapsed since connection of the voltage to the scale. To dramatically reduce the time required for the scale to reach its full accuracy after connection of the voltage supply, the digital signal processing unit (18) has computation modules (34, 35) that correct the weight-dependent signal generated by the weighing system by a correction value that depends on the time elapsed. The magnitude of this correction value, starting from an initial correction value, converges with increasing time elapsed to a constant end value that differs from the initial correction value.

25 Claims, 7 Drawing Sheets

ELECTRONIC SCALE AND METHOD FOR WEIGHT MEASUREMENT INCLUDING CORRECTION MEANS FOR CORRECTING A WEIGHT DEPENDENT SIGNAL

This is a Continuation of International Application PCT/EP2004/011033, with an international filing date of Oct. 2, 2004, which was published under PCT Article 21(2) in German, and the disclosure of which is incorporated into this application by reference.

BACKGROUND OF THE INVENTION

1. Field of the Invention

Apparatuses and methods consistent with the present invention relate to scale having an electronic weighing system and a digital signal processing unit. The electronic weighing system generates a weight-dependent signal, and the digital signal processing unit has circuit or program parts that detect the time elapsed since the connection of a voltage supply to the scale. The time elapsed is used to determine a correction value for correcting the weight-dependent signal.

2. Description of the Related Art

Scales of this type are known, for example, from U.S. Pat. No. 4,763,739. The circuit or program parts that detect the time elapsed since the connection of the voltage supply are used to suppress incorrect weighing results immediately after the voltage supply is connected. Until the voltage supply is connected, all mechanical and electronic components of the scale have the temperature of the scale's environment. However, because the electronic components generate heat during operation of the scale, a certain temperature distribution is gradually established within the scale after the voltage supply is connected and reaches a final steady state after a certain time known as the warm-up time. During this warm-up time, the zero point and/or sensitivity of the scale differs somewhat from the setpoint. As such, there is a risk, particularly in high-resolution scales, that the weighing values will lie outside of specifications. It is therefore customary to suppress the display of the scale during the warm-up time. In U.S. Pat. No. 4,763,739, a fixed duration is provided for the warm-up time.

This fixed duration for the warm-up time must of course correspond to the maximum warm-up time. However, if the scale was only briefly disconnected before the voltage supply was reconnected, the final steady temperature distribution state is reached substantially faster. To take this into account, European Publication EP 1,130,370 proposes a scale in which the digital signal processing unit is provided with computation means to calculate the necessary warm-up time from the signal of a temperature sensor and may also display the calculated warm-up time on the scale's display. As a result, the scale is blocked for the maximum warm-up time only if it has been turned off for a prolonged period of time, whereas if the OFF period was short, the warm-up time is shortened as well. Incidentally, EP 1,130,370 shows a calculated warm-up time of 28 minutes in the exemplary embodiment described there and a possible display of several hours, which makes it clear that the warm-up time may be considerably long in high resolution scales.

OBJECTS OF THE INVENTION

An object of the invention is to substantially reduce the time required to reach the full accuracy of an electronic scale after connection of the voltage supply.

SUMMARY OF THE INVENTION

In one aspect of the invention, this object is attained by providing the digital signal processing unit with computation means that corrects the weight-dependent signal generated by the weighing system by a correction value that depends on the time elapsed since power-up. The magnitude of this correction value, starting from an initial correction value, converges, with increasing time elapsed since power-up of the unit, to a constant end value that differs from the initial correction value.

Thus, the invention does not wait for the steady temperature distribution to be reached within the scale but rather, prior thereto, uses the corresponding correction value to ensure that any errors of the scale caused by the absence of a temperature equilibrium are corrected. Because the temperature imbalance decreases gradually, the magnitude of the correction is also reduced gradually, preferably to zero, so that by the end of the thermal compensation process the correction is eliminated altogether. The "warm-up time" that is visible for the user of the scale until the full accuracy of the weighing result is reached is therefore significantly shorter than the thermal warm-up time, and is determined only by the length of time required to determine the parameters necessary for the correction calculation.

The magnitude of the initial correction value depends on how long the scale had been disconnected before being reconnected. Hereinafter, the length of time the scale had been disconnected before being reconnected is referred to as the OFF time or duration. In a first exemplary embodiment, the OFF time is determined by a clock component, for example a commercially available electronic clock component. Because the accuracy requirements for determining this time period are not very high and it is primarily a matter of determining shorter OFF times, even a capacitor slowly discharging via a resistor is suitable as a clock component. For example, it makes little difference whether the scale was turned off for two hours or for a longer period of time, such as for four hours. The capacitor is always charged to a fixed voltage when the scale is connected and gradually discharges while it is disconnected. The residual voltage present when the voltage supply is reconnected is then used as a measure for the OFF time. Modern capacitors make it possible to achieve a time constant of twenty minutes, for example, so that the critical OFF times from one minute up to one hour can be measured with sufficient accuracy.

In another exemplary embodiment, the OFF time is measured indirectly. To this end, the scale is equipped with a temperature sensor. The temperature change rate is measured immediately after the scale is connected and the initial correction value is then determined. If the scale was disconnected for only a short time, the temperature distribution differs very little from the steady temperature distribution, so that the temperature of the temperature sensor rises only very slightly after connection of the scale. On the other hand, if the scale was disconnected for a relatively long time, the temperature distribution differs substantially from the steady temperature distribution and largely matches the ambient temperature. Accordingly, the temperature changes much more markedly after the scale is turned on. Thus, the change rate of the temperature immediately after the scale is turned on can be used to infer the length of the OFF time. This indirect time measurement is of course most accurate for short OFF periods and becomes increasingly less accurate for longer OFF periods. This is not a problem, however, because the size of the required weighing signal correction practically does not change any more if the OFF periods are relatively long. Similarly, the OFF duration can be indirectly determined by evaluating the temperature difference between two temperature sensors in the scale. If one of the temperature sensors is installed near the heat generating components, it will reach a certain overtemperature compared to the ambient temperature in the steady state. If the other temperature sensor is remote from the heat generating components, it will almost remain at the ambient temperature. When the scale is turned off, the overtemperature of the first sensor gradually drops and reaches zero after a relatively long time. Thus, the temperature difference of the two temperature sensors when the voltage supply is reconnected can also be used to infer the length of the OFF time.

BRIEF DESCRIPTION OF THE DRAWINGS

The invention will now be described in greater detail with reference to the drawings, in which.

DETAILED DESCRIPTION OF EXEMPLARY EMBODIMENTS OF THE INVENTION

Figure 1:
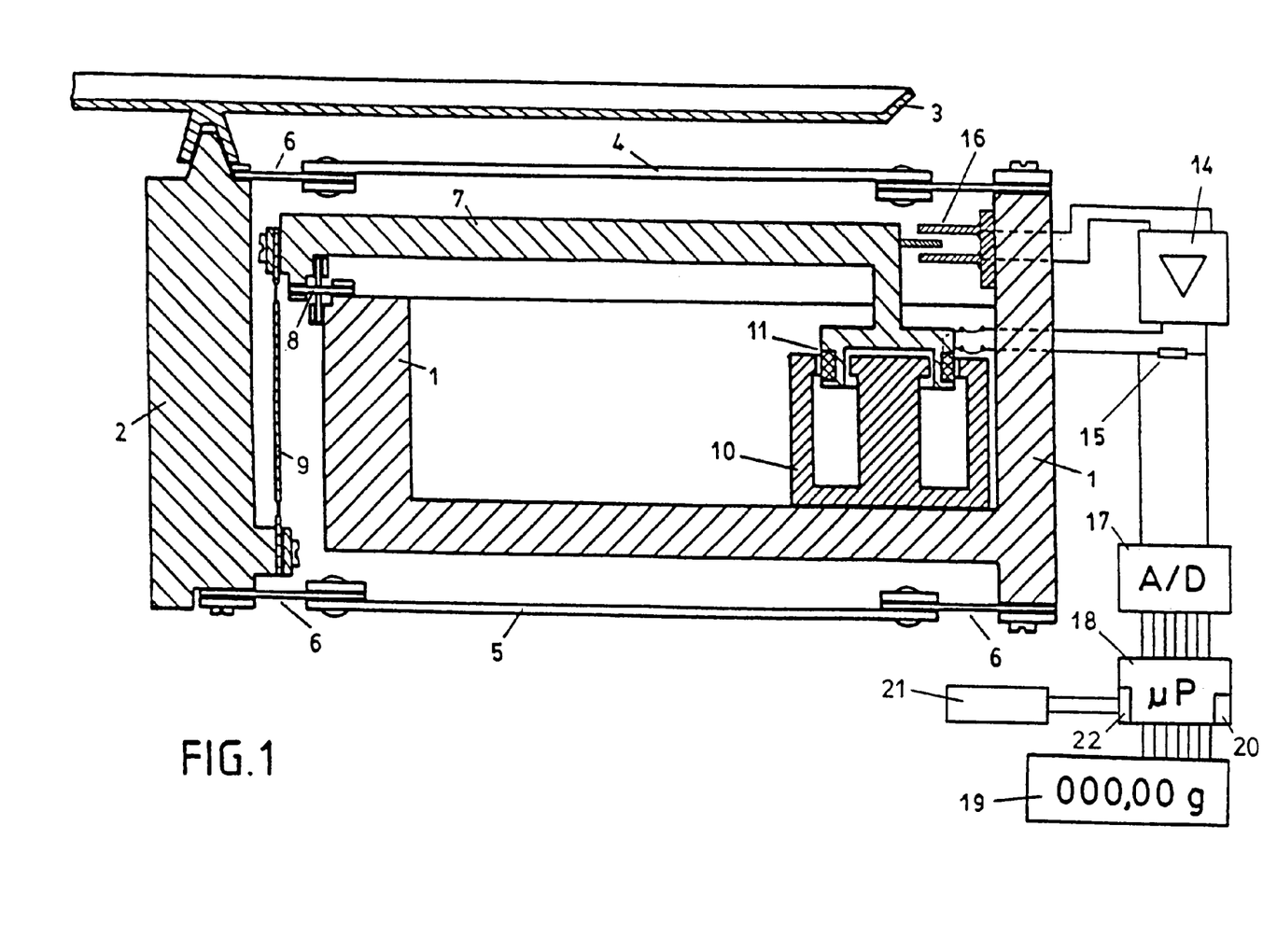
FIG. 1 shows a first exemplary embodiment of a scale according to the present invention.

The electronic scale shown in FIG. 1 has a support member 1 fixed to a housing, to which a load receiver 2 is vertically and displaceably mounted via two guides 4 and 5 which have articulation points 6. The upper part of the load receiver 2 carries a pan 3 for receiving the goods to be weighed, and transmits the force corresponding to the mass of the goods being weighed to the shorter lever arm of the transmission lever 7 via a coupling element 9. The transmission lever 7 is supported on the support member 1 by a flexural pivot 8. The longer lever arm of the transmission lever 7 engages the compensation force generated by a current-carrying coil 11 in the air gap of a permanent magnet system 10. The magnitude of the compensation current is regulated by a position sensor 16 and a control amplifier 14 such that the weight of the goods being weighed and the electromagnetic compensation force are in equilibrium. The compensation current generates a measuring voltage at the measuring resistor 15, which is supplied to an analog-to-digital (A/D) converter 17. The digitized result is accepted by a digital signal processing unit 18 and displayed on the digital display unit 19. A measuring device, such as a circuit or program parts 20, which measures the time elapsed from the connection of the voltage supply, is schematically indicated within the digital signal processing unit 18. A measuring device, for example, may comprise the timing generator of a microprocessor forming the digital signal processing unit 18 in cooperation with a corresponding software configuration. Other parts of the electronic scale described above and their function are generally known in the art, and there is no need to describe and explain them in greater detail here.

The scale according to the invention illustrated in FIG. 1 furthermore has a clock component 21, which is used to determine the length of time for which the scale was disconnected before being reconnected. Details are shown in the block diagram of FIG. 2 and a method of the present invention is shown in the flow diagram of the warm-up process of FIG. 3. The clock component may, for example, be a conventional radio clock component, which continuously receives the actual time and forwards it to the digital signal processing unit 18. The digital signal processing unit 18 stores this time in a non-volatile memory area 22. If the scale is turned off, the most recent time is stored in the memory area 22. When the voltage supply is reconnected, the digital signal processing unit 18 compares the time stored in the memory area 22 with the first time supplied by the radio clock component (block 31 in FIG. 3) during the warm-up routine (block 30 in FIG. 3) and calculates the difference between the two times and thus, the duration for which the scale was turned off (block 32 in FIGS. 2 and 3). The digital signal processing unit 18 then uses this duration to calculate the initial correction value based on predefined formulas (block 34 in FIGS. 2 and 3).

Figure 2:
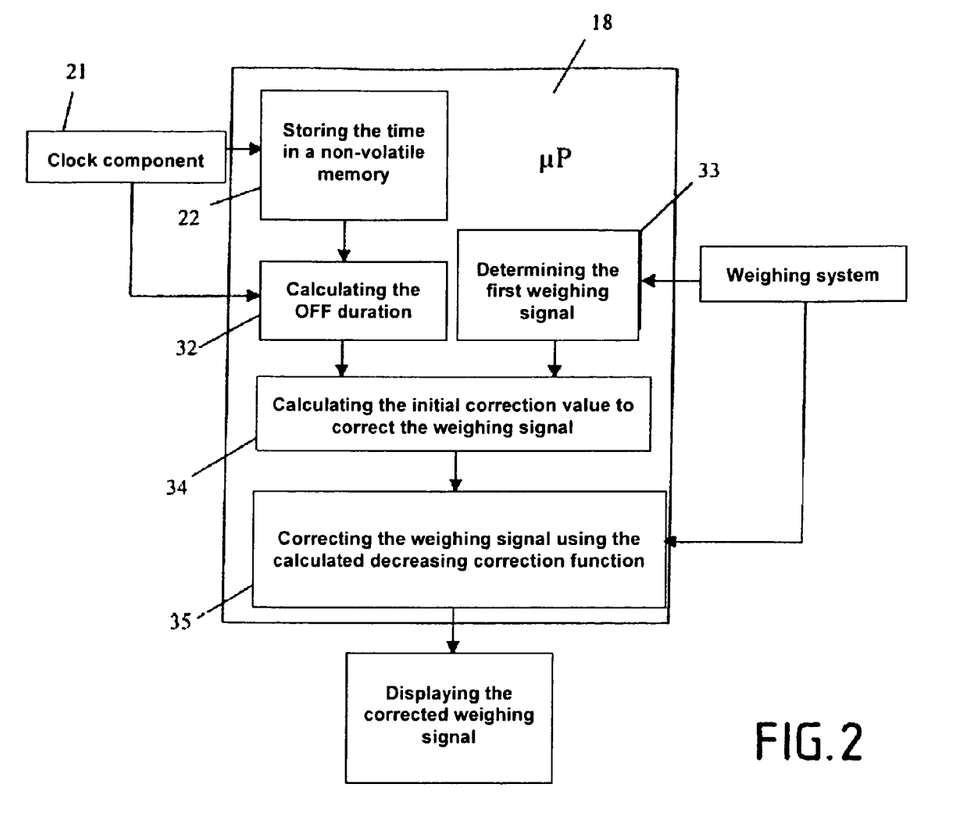
FIG. 2 is a block diagram illustrating the determination of the OFF time and the correction for the scale shown in FIG. 1.
Figure 3:
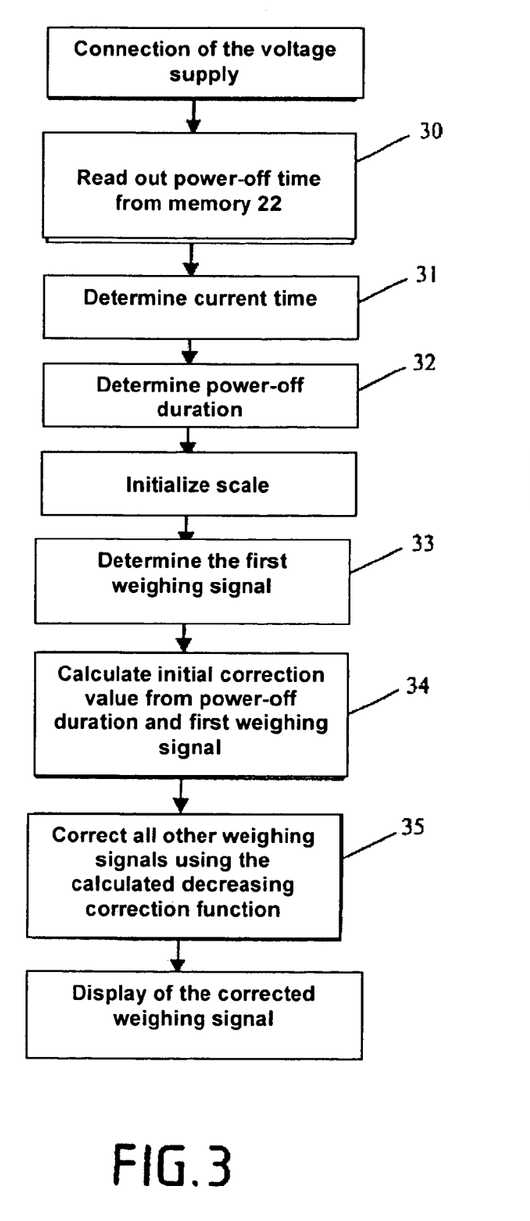
FIG. 3 is a flow diagram of the power-up process for the scale shown in FIG. 1.

In the example illustrated in FIGS. 2 and 3, the initial correction value depends not only on the OFF duration, but also on the first weighing signal (block 33). This is useful in scales operating according to the principle of electromagnetic force compensation and having spring articulation points, such as the scale shown in FIG. 1. These scales have a transient response setpoint position, which is given by the position sensor 16. The magnitude and the sign of the first weighing signal can then be used to determine how far and in which direction the movable parts of the scale (transmission lever 7 and guides 4 and 5) were deflected out of the transient response setpoint position prior to reaching the transient response setpoint position. The magnitude and the sign of the initial creep of the articulation points 6 and the flexural pivot 8 depend on this deflection. If this creep is to be corrected as well, the digital signal processing unit 18 should calculate a corresponding initial correction value as a function of the first weighing signal. The calculated initial correction value and the predefined decreasing function, e.g., an e-function, are then used to calculate the final decreasing correction function with which all the weighing signals are continuously corrected (block 35 in FIGS. 2 and 3).

It should be noted, in particular, that blocks 30 through 34 are and executed only once after connection of the voltage supply. Then, the initial correction value thus calculated and the predefined decreasing function are used thereafter to correct the weighing signals continuously in block 35. Based on the decreasing function, the magnitude of the correction gradually decreases to a constant value, which is preferably selected to be zero.

The term "initial correction value" as used above may consist of several components and the "decreasing function" may include several time constants. Represented mathematically, in the case of e-functions as the decreasing function, the correction function may be an expression of the form:

$$K(t) = \sum_{n=1}^{N} K_n \cdot e^{t/m} \qquad (1)$$

where $K_1, K_2, \ldots, K_N$ is the initial correction value and $t_1, t_2, \ldots, t_N$ are the decreasing time constants. If the behavior after power-up is characterized, for example, by thermal heating and by the creep of the spring elements 6 and 8, two values $K_1$ and $K_2$ as the initial correction values and two time constants $t_1$ and $t_2$ would provide a sufficiently accurate correction. If the thermal influence ($K_1$ and $t_1$) affects the zero point and the sensitivity of the scale, K, would of course have a component for the zero point and a component for the sensitivity. Because the spring creep ($K_2$ and $t_2$) generally affects only the zero point, $K_2$ would include only a component for the zero point. If additional effects after connection of the voltage supply must be corrected or if the time behavior is more complex, additional terms in equation (1) or different decreasing functions would of course be desired.

In the illustrated and described example, the clock component is a radio clock component, which is turned on and off together with the scale. Other clock components may also be used, however. If the clock component has a separate uninterruptible power supply, any standard clock component may be used. As a further alternative, the scale may have a modem, for example, which can establish a wire-bound or wireless connection to an external clock. Further, a radio control (RC) element, may be used as a simple replacement for a clock component. Together with the disclosure provided in this application, persons skilled in the art can readily work out the circuit or programming details of this alternative solution, and as such, these details do not need to be presented or explained here.

Figure 4:
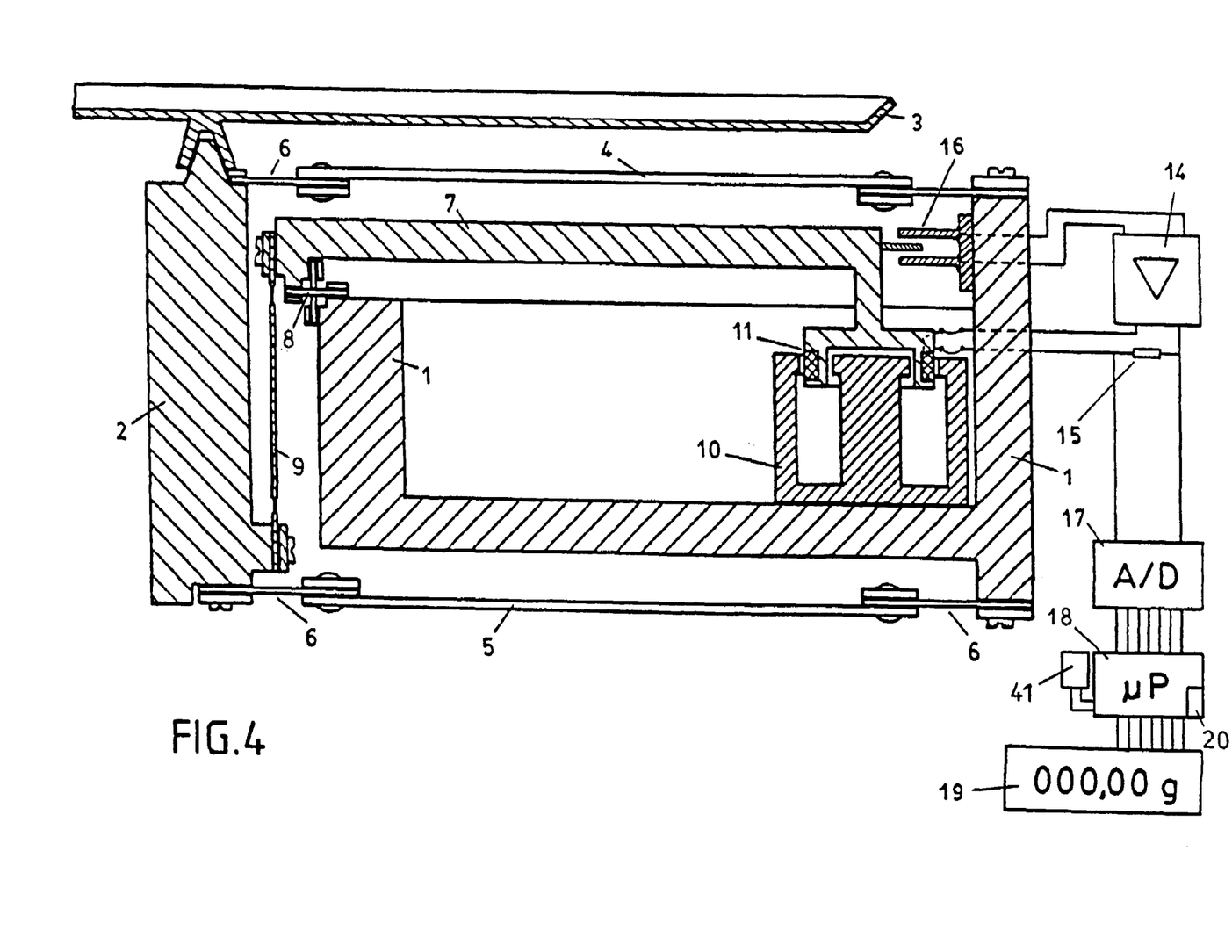
FIG. 4 shows a second exemplary embodiment of a scale according to the present invention.

A second exemplary embodiment of the scale is depicted in FIG. 4. Components 1 through 20 correspond to the first embodiment shown in FIG. 1 and are therefore not described again here. The exemplary embodiment of the scale according to FIG. 4 includes a temperature sensor 41 in proximity of the electronics (A/D converter 17 and digital signal processing unit 18). This temperature sensor is used to indirectly determine the OFF duration. Its function will now be described with reference to FIG. 5. If the scale was turned off for a long time, the temperature measured by the temperature sensor 41 is the same as the ambient temperature (point 42). If the scale is connected at time t=0, the temperature measured by the temperature sensor 41 rises in accordance with the depicted curve 44 and finally reaches the steady end value 43. On the other hand, if the scale, at the same ambient temperature, is disconnected only briefly before being reconnected, the temperature measured by the temperature sensor 41 is higher at the time when the unit is connected (point 45) and rises in accordance with the dashed curve 46 to the same steady end value 43. Because the ambient temperature can vary and is unknown to the digital signal processing unit, the absolute magnitude of the temperature at the time when the scale is connected will not give any indication with regard to the OFF duration. However, the time required for the temperature to rise immediately after connection of the voltage supply can be used to infer the OFF duration. If the OFF duration is long, the maximum temperature rise according to curve 44 results. If the OFF duration is shorter, the lesser temperature rise indicated by the dashed curve 46 results, and if the OFF duration is very short, the temperature rise after power-up is close to zero.

Figure 5:
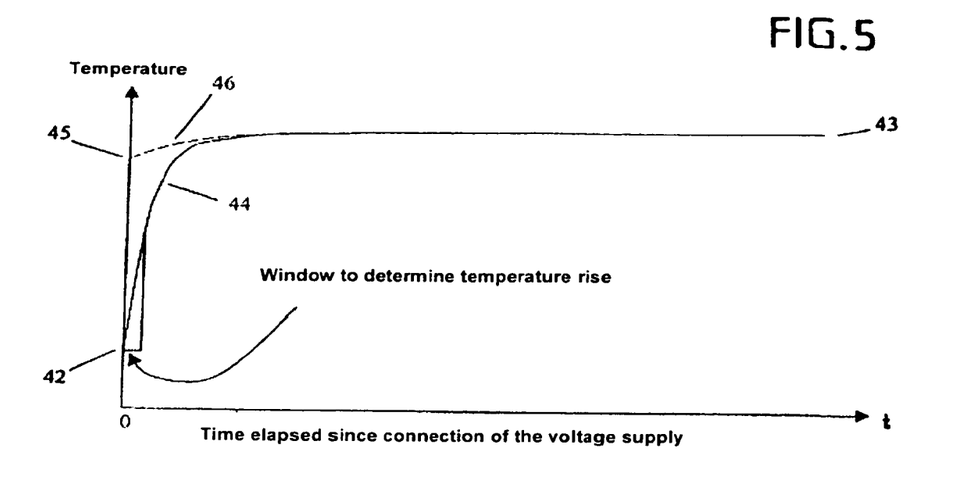
FIG. 5 is the temperature curve after connection of the voltage supply for the scale of FIG. 4.

The temperature rise over time is determined by measuring the temperature at the beginning and at the end of a window of 30 seconds, for example, as indicated on curve 44 in FIG. 5.

Figure 6:
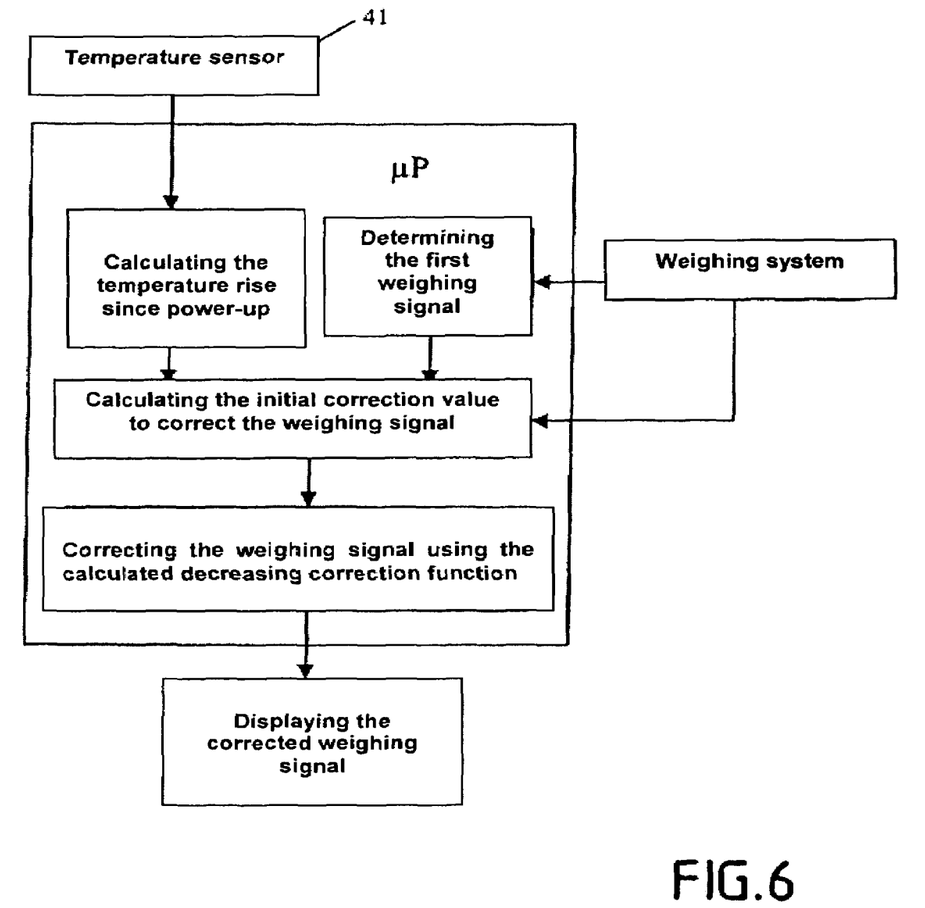
FIG. 6 is a block diagram illustrating the determination of the OFF time and the correction for the scale of FIG. 4.
Figure 7:
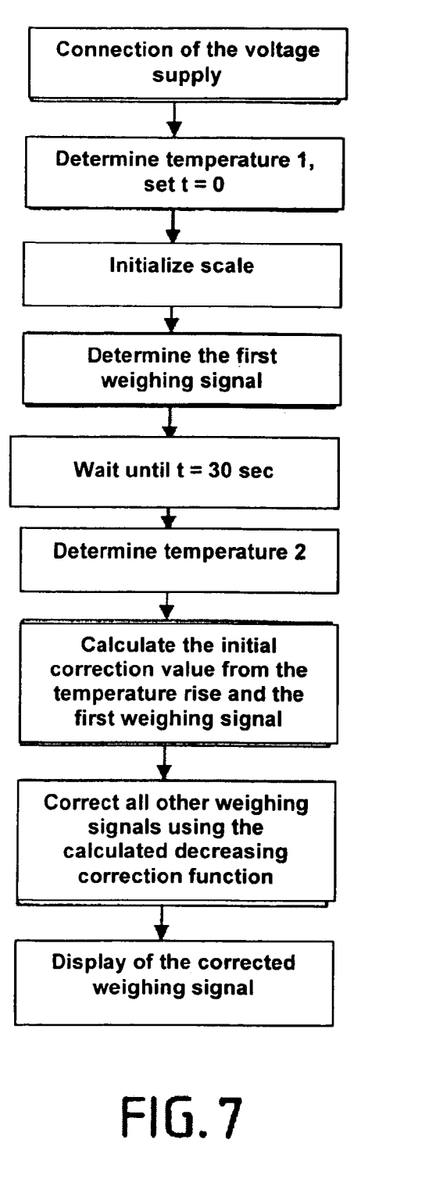
FIG. 7 is a flow diagram of the power-up process for the scale of FIG. 4.

The block diagram pertaining to this second embodiment and illustrating this function is depicted in FIG. 6. FIG. 7 shows the associated flow diagram. The two representations correspond to FIGS. 2 and 3 and are self-explanatory to one of ordinary skill in the art based on the comments provided above.

Figure 8:
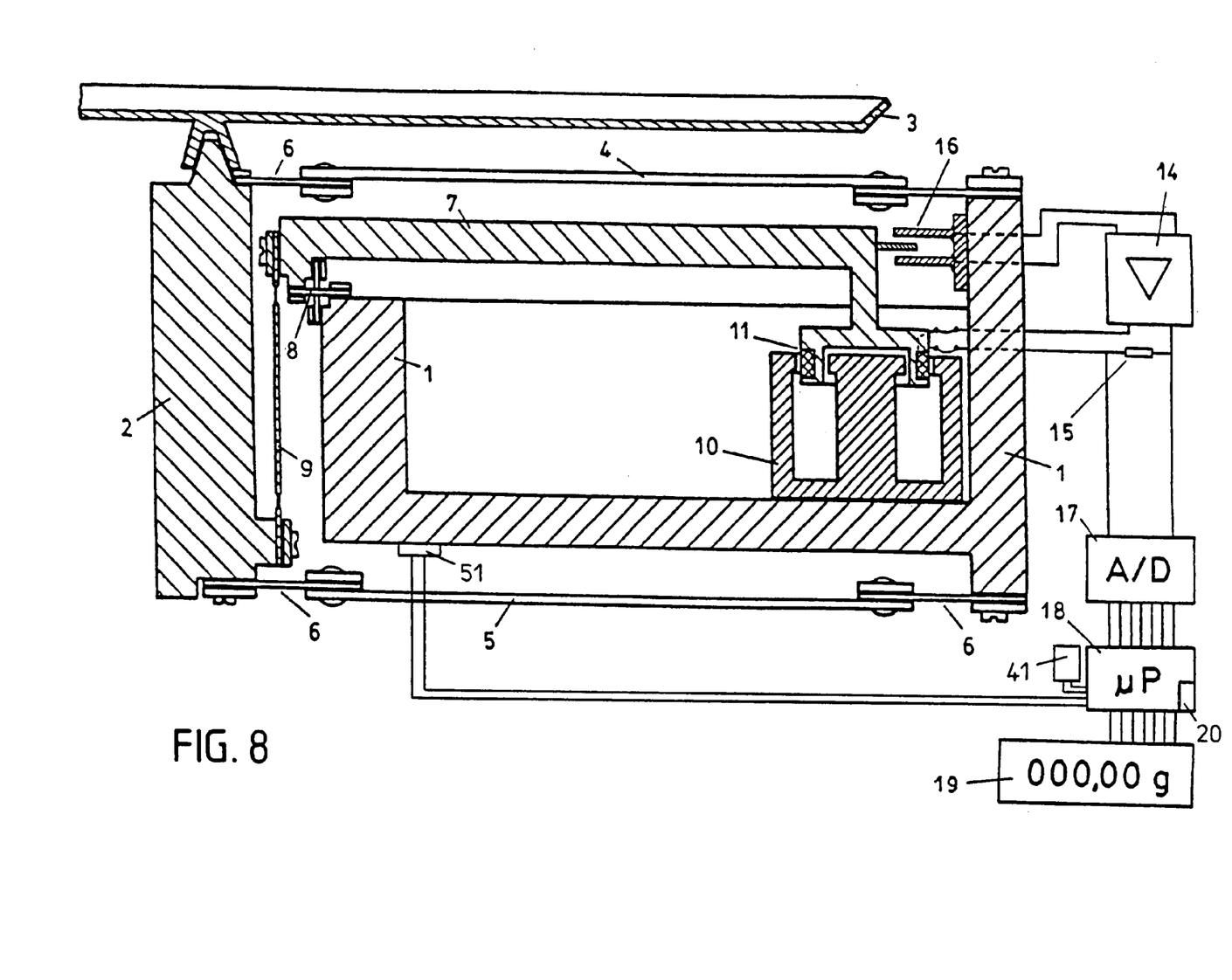
FIG. 8 shows a third exemplary embodiment of a scale according to the present invention.
Figure 9:
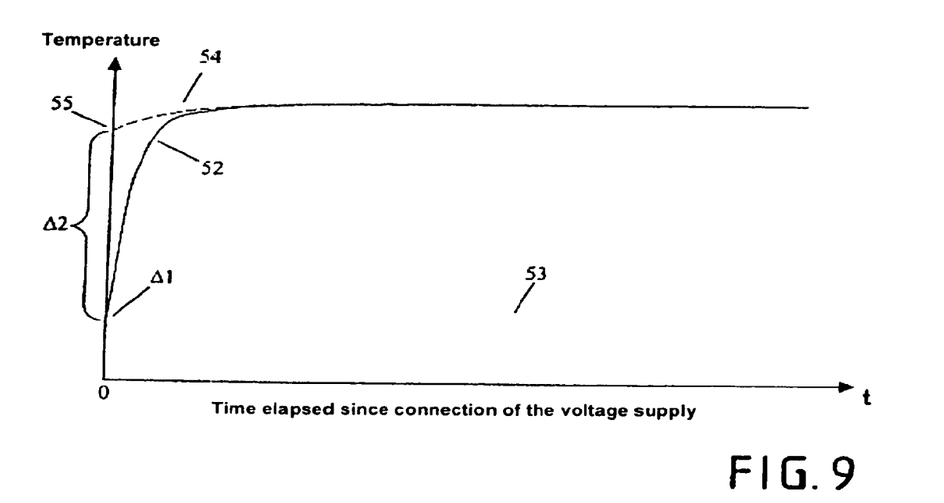
FIG. 9 depicts the temperature curve after connection of the voltage supply for the scale of FIG. 8.

FIG. 8 shows a third exemplary embodiment of a scale according to the present invention. Components 1 through 20 correspond to the first embodiment illustrated in FIG. 1 and are therefore not described again here. The embodiment of the scale according to FIG. 8 has both a temperature sensor 41 near the electronic components and a temperature sensor 51 remote from all heat-generating components. In FIG. 8, this temperature sensor 51 is shown on the support member 1, which is connected to the housing of the scale (not depicted) in a thermally highly conductive manner. If the scale is turned off for a prolonged period of time, both temperature sensors 41 and 51 are at ambient temperature. FIG. 9 illustrates the temperature curve of the temperature sensors after connection of the voltage supply. The solid curve 52 applies to the temperature sensor 41, the dotted curve 53 applies to the temperature sensor 51. The temperature difference Δ1 between the two temperature sensors is practically zero immediately after the scale is connected. If, on the other hand, the scale was disconnected only briefly before being reconnected, the dashed temperature curve 54 of the temperature sensor 41 starts at a higher temperature (point 55) and reaches the same end value as curve 52. For the temperature sensor 51, the shape of the curve 53 is practically identical in both cases, so that no difference is evident in FIG. 9. The temperature difference Δ2 between the two temperature sensors is significantly greater in this case. The magnitude of the temperature difference Δ between the two temperature sensors 41 and 51 immediately after connection of the voltage supply can thus be used to infer the OFF duration. Based on the OFF duration thus determined, the initial correction value is calculated as described above and is used to calculate the decreasing correction function to correct the weighing signals.

The invention has been described above with reference to a scale operating according to the principle of electromagnetic force compensation, but its use is not limited to this type of scale. Scales with strain gauges, for example, have a warm-up phase after connection of the voltage supply, which can be corrected according to the invention.

The above description of exemplary embodiments of the invention has been given by way of example. From the disclosure given, those skilled in the art will not only understand the present invention and its attendant advantages, but will also find apparent various changes and modifications to the structures and methods disclosed. It is sought, therefore, to cover all such changes and modifications as fall within the spirit and scope of the invention, as defined by the appended claims, and equivalents thereof.

What is claimed is:

1. A scale comprising:
   an electronic weighing system operative to generate a weight-dependent signal; and
   a digital signal processing unit,
   wherein the digital signal processing unit comprises at least one of a circuit and program parts operative to measure a time elapsed from connection of a voltage supply to the scale, and said digital signal processing unit further comprising:
computation means for correcting the weight-dependent signal by a correction value, the correction value depending on the time elapsed from connection of the voltage supply to the scale,
wherein a magnitude of the correction value starts at an initial correction value upon connection of the voltage supply to the scale, and converges to a constant end value as time elapses.

2. The scale as claimed in claim 1, wherein the constant end value is zero.

3. The scale as claimed in claim 2, wherein the correction value decreases to zero in accordance with an exponential function.

4. The scale as claimed in claim 1, wherein a correction value at any point in time is determined by:

$$K(t) = \sum_{n=1}^{N} K_n \cdot e^{t/\tau_n}$$

where $K_1, K_2, \ldots, K_N$ are the initial correction values and $t_1, t_2, \ldots, t_N$ are decreasing time constants.

5. The scale as claimed in claim 1, wherein the scale further comprises a clock, wherein the clock provides information used to determine an OFF duration, and wherein the initial correction value is selected as a function of the OFF duration.

6. The scale as claimed in claim 5, wherein the OFF duration is determined by a difference between a current time and a power-off time, wherein the power-off time is obtained from a memory of the scale.

7. The scale as claimed in claim 5, wherein the clock is a radio clock.

8. The scale as claimed in claim 5, wherein the clock includes a voltage supply independent of the voltage supply used to supply a voltage to the scale.

9. The scale as claimed in claim 5, wherein the clock comprises a capacitor set to discharge via a resistor.

10. The scale as claimed in claim 1, further comprising at least one of a wire-bound and wireless connection operable to connect to an external clock.

11. The scale as claimed in claim 1, wherein the scale includes at least one temperature sensor, and the initial correction value is selected as a function of a rate of change of an output signal of the at least one temperature sensor following the connection of the voltage supply to the scale.

12. The scale as claimed in claim 11, wherein the rate of change of the output signal of the at least one temperature sensor is determined from at least two measurements taken at a predefined time interval, wherein a first measurement of the at least two measurements is taken following the connection of the voltage supply to the scale.

13. The scale as claimed in claim 1, wherein the scale has at least two temperature sensors, the at least two sensors disposed at differing locations, and wherein the initial correction value is selected as a function of a difference of output signals of the at least two temperature sensors following the connection of the voltage supply to the scale.

14. The scale as claimed in claim 1, wherein the correction value comprises both a component for a zero point and a component for sensitivity.

15. The scale as claimed in claim 5, wherein the weighing system operates according to a principle of electromagnetic force compensation, and the initial correction value is selected as a function of the magnitude of the weight-dependent signal following the connection of the voltage supply to the scale.

16. The scale as claimed in claim 10, wherein the weighing system operates according to a principle of electromagnetic force compensation, and the initial correction value is selected as a function of the magnitude of the weight-dependent signal following the connection of the voltage supply to the scale.

17. The scale as claimed in claim 11, wherein the weighing system operates according to a principle of electromagnetic force compensation, and the initial correction value is selected as a function of the magnitude of the weight-dependent signal following the connection of the voltage supply to the scale.

18. The scale as claimed in claim 13, wherein the weighing system operates according to a principle of electromagnetic force compensation, and the initial correction value is selected as a function of the magnitude of the weight-dependent signal following the connection of the voltage supply to the scale.

19. The scale as claimed in claim 1, wherein the constant end value differs from the initial correction value.

20. The scale as claimed in claim 1, wherein the computation means comprises a microprocessor.

21. A method for weight measurement of an object using a scale, comprising:
generating a weight-dependent signal of an object to be weighed;
determining an OFF duration of the scale; and
correcting the weight-dependent signal by a correction value,
wherein a magnitude of the correction value starts at an initial correction value determined from the OFF duration, and
wherein the magnitude of the correction value converges to a constant end value as time elapses from supply of a voltage to the scale.

22. The method for weight measurement as claimed in claim 21, wherein the OFF duration is determined by a difference between a current time and a power-off time.

23. The method for weight measurement as claimed in claim 21, wherein the initial correction value is selected as a function of a rate of change of a temperature signal following the supply of the voltage to the scale.

24. The method for weight measurement as claimed in claim 21, wherein the initial correction value is selected as a function of a temperature differential within the scale, following the supply of the voltage to the scale.

25. A method for weight measurement of an object using an electronic scale, comprising:
generating a weight-dependent signal of an object to be weighed; and
correcting the weight-dependent signal by a correction value,
wherein the correction value depends on a time elapsed from switching on the scale, and
wherein a magnitude of the correction value starts at an initial correction value at the time of switching on the scale and converges to a constant end value in accordance with the time elapsed.

* * * * *